United States Patent Office 3,108,886
Patented Oct. 29, 1963

3,108,886
HARD, REFRACTORY CRYSTALLINE MATERIALS
Robert F. Adamsky, Eggertsville, N.Y., and Carl F. Cline, Livermore, Calif., assignors to The Carborundum Company, Niagara Falls, N.Y., a corporation of Delaware
No Drawing. Filed Dec. 29, 1958, Ser. No. 783,211
10 Claims. (Cl. 106—55)

This invention relates to new inorganic crystalline materials of hard, refractory character. More particularly, it pertains to hard, refractory crystalline materials composed of boron and silicon, with or without minor amounts of modifying carbon.

Interest in hard and refractory materials has been prevalent from times dating back to Moissan at the turn of the century and remains to this day the subject of widespread research. Although Moissan and his co-workers reported at an early date the preparation of silicon triboride, $SiB_3$, and silicon hexaboride, $SiB_6$, by fusion of the elements, and described a number of their physical properties, many subsequent investigators were unsuccessful in their attempts to duplicate their original findings. More recently, there have been conflicting reports regarding the various physical properties of these same two earlier-reported silicon borides.

It is an object of the present invention to reveal for the first time a new silicon boride material.

It is a further object of the present invention to disclose new silicon-boron compositions modified by small amounts of carbon.

It is a still further object to provide for the first time silicon boride compositions of unusually high carbon content.

It is a further object to provide methods by which the aforesaid materials can be made.

Other objects and advantages accruing from the present invention will become apparent as the description proceeds.

We have discovered a new silicon boride, or silicon-boron material, of crystalline character, of high refractoriness and exceptional hardness, and having an unusually high boron content responding substantially to the empirical formula of $SiB_{12}$. We have further found that such silicon boride materials of high-boron content can be modified by small amounts of carbon to provide other ternary compositions of high refractoriness and hardness.

PREPARATION

The preparation of the above high-boron silicon-boron and silicon-boron-carbon crystalline materials can be accomplished by means of either one of two different methods, the first being the peritectic melting of the silicon hexaboride, $SiB_6$, and the second method being the direct fusion of the elements in suitable proportions. The two materials are usually obtained in admixture, the amount of the carbon-containing silicon-boron material depending upon the amount of carbon derived from the surroundings in the course of the reaction as well as any carbon that may be added as a deliberate constituent of the initial raw batch.

A high-boron silicon boride having the approximate empirical formula $SiB_{12}$ has been made by the peritectic melting of silicon hexaboride, $SiB_6$, in the following manner. About 50 grams of silicon hexaboride crystals, in the form of a loose mass of about 20 mesh material, was placed in a boron nitride crucible. The boron nitride crucible was covered with a boron nitride lid and then placed in a graphite crucible. Boron nitride powder was placed between the graphite and boron nitride crucibles in order to minimize the carbon contamination. The charge was then heated in an induction furnace to a temperature of approximately 2250° C., where it was held from 30 minutes to 1 hour. An argon atmosphere was maintained during the heating and cooling of the melt. The charge, when the crucible was opened, was found to be in the form of a fused mass containing free silicon. The free silicon was removed by acid treatment with a hydrogen fluoride-nitric acid mixture and the residue dried and fused with potassium hydroxide to remove any traces of nitride. The product, under the microscope, apeared as black, shiny, opaque single rhombohedra, and aggregates of rhombohedra, and as black, opaque aggregates and masses having poorly defined crystalline morphology. About 5 to 10 grams of the silicon dodecarboride, $SiB_{12}$, were obtained in this manner from a raw batch of 50 grams of silicon hexaboride.

A crystalline product comprising a mixture of the silicon dodecaboride, $SiB_{12}$, and the above silicon-boron-carbon material, was obtained by the direct fusion of the elements as follows. 1 part by weight of elemental silicon, in the form of very fine powder, and 3 parts by weight of elemental boron, in the form of fine powder, were placed in a boron nitride crucible, with a boron nitride lid. The mixture occupied about 80% of the free volume in the crucible. The crucible and contents were heated in an induction furnace, in an argon atmosphere, to a temperature of 2250° C., and held at that temperature for approximately 1 hour. The crucible and contents were then cooled; the time of cooling to 1000° C. was about 30 minutes. The resulting fused mass was treated with hydrofluoric acid-nitric acid to remove free silicon and the residue collected by filtration. The resulting product had an appearance very similar to that obtained by the peritectic melting of silicon hexaboride. Some silicon hexaboride was found in the synthesis.

Other fusions were similarly carried out by heating mixtures of boron and silicon ranging from 75 to 94% by weight boron with 25 to 6% by weight silicon. The relative amount of silicon hexaboride and silicon dodecaboride appeared to depend on the rate of cooling over various temperature ranges. Slow cooling to a point just above the melting point of silicon hexaboride, followed by rapid cooling through the melting point, appeared to favor the formation of the silicon dodecaboride. The amount of the carbon-modified high-boron silicon boride was dependent upon the amount of carbon picked up from the surroundings in the course of the reaction, and where the reaction was carried out with careful precautions against the introduction of carbon from the outer graphite crucible, the amount of the carbon-modified silicon-boron material was negligible.

Products of the present invention have also been made by direct synthesis of the elements by fusion wherein the fusion was carried out using a non-consumable arc melting furnace. Some difficulty was encountered in the melting of the materials due to the high resistance of the silicon and boron, although this was overcome by extending the arc length until a small amount of liquid formed. The material was maintained in the molten state for approximately 2 to 3 minutes, whereupon the melt was rapidly quenched. However, this latter method was not found as satisfactory as the crucible fusions because of the extensive loss of material due to vaporization.

CHEMICAL ANALYSIS

The chemical analyses of the samples were carried out using both wet chemical and spectographic techniques. The products obtained from fusions carried out using boron nitride crucibles, which were heated in a furnace using graphite as an outer resistor or susceptor, contained carbon as the major impurity. A tabulation of the analyses of several representative samples, as well as the analysis of an arc melted sample, are listed in Table 1 below. There appears to be a wide range of carbon contamination, with the usual percentage of carbon ranging from 1 to 3%, although material analyzing up to as high as 8% carbon has been obtained. The boron content, however, appears to remain fairly constant at about 80% or more. Due to analytical difficulties in determining boron, there is reason to believe that the actual percentage of reported boron is slightly on the low side. The silicon content ranged from 6 to 20%, while the average was around 12%.

It may be noted here that the theoretical composition for $SiB_{12}$ is silicon 17.7% and boron 82.3%.

The spectrographic analyses showed that the major elements present were boron and silicon.

Table 1

| Sample No. | Percent B | Percent Si | Percent C |
| --- | --- | --- | --- |
| 1 | 82.03 | 12.22 | 2.43 |
| 2 | 83.75 | 12.14 | 1.09 |
| 3 | 85.87 | 6.17 | 1.91 |
| 4 | 83.36 | 10.18 | |
| 5 | 82.69 | 11.68 | 2.21 |
| 6 | 79.61 | 19.11 | 1.04 |
| 7 (Arc melted sample) | 86.51 | 9.30 | .65 |

CRYSTAL STRUCTURE AND APPEARANCE

The fused and treated product was examined using conventional microscopic and X-ray techniques. Examination of those samples which showed the presence of carbon by chemical analysis gave strong evidence of the existence in the material, in addition to the silicon dodecaboride, of a silicon-boron-carbon ternary material. The product which showed the presence of modifying carbon yielded rhombic crystal plates which resembled boron carbide in some respects but had a reddish brown color. Most of the material exhibited a conchoidal fracture and had a poorly defined crystallographic morphology. The powder patterns for the material likewise showed the presence of rhombic crystals. Single crystal studies were made of the rhombic plates, using oscillation, rotation and Weissenberg techniques. It was clearly established that the crystal system is rhombohedral.

PHYSICAL PROPERTIES

The density of the carbon-free product was determined with a pycnometer, using ethyl benzene as a displacing liquid, and by flotation in a mixture of carbon tetrachloride and 1,1,2,2-tetrabromomethane, and found to be 2.39 gr./cm.$^3$. The density for the carbon-modified material, measured similarly, was found to be around 2.50.

The product is not appreciably attacked by solutions of such common acids as hydrofluoric, nitric and hydrochloric at room temperature.

The hardness of the material was measured qualitatively by mounting a single crystal of the material in a small aluminum tube, the crystal being supported by a plastic metal cement. The crystal was drawn across the polished surface of mounted crystals of silicon carbide, boron, and boron carbide, and it was observed that all three materials were scratched by the product of the present invention, thereby indicating that the present material is harder than all three named materials.

The hardness of the rhombic crystals was also determined using a 100 gram load with a Knoop indenter, the hardness for the carbon-free high-boron silicon boride material for a number of samples being from 2492 to 2729, with an average Knoop hardness of 2624. The measured hardness for the carbon-containing ternary phase material was measured over the range 2296–2969, with an average Knoop hardness of 2868. In fact, occasional Knoop hardnesses for both materials have been obtained in excess of 3900 kg./mm.$^2$.

Electrical resistivity measurements on single crystals of the material show that the resistivity ranges between 0.2 and 10 ohm-cm.

Melting point determinations were made and the average of several determinations showed that the carbon-free silicon dodecaboride showed a melting point of 2250° C. whereas the carbon-modified silicon-boron material averaged 2175° C.

The properties of the material suggest its use as an abrasive in either loose or fabricated form, as a component in refractory compositions, and as a material for the fabrication of wear-resisting parts such as bearing surfaces. The unusually high boron content makes the material atractive as a nuclear shielding material or as a control material in the field of the utilization of atomic energy.

Having described the invention, it is desired to claim:

1. A high-boron silicon boride material containing in excess of 80% by weight combined boron and in excess of 6% by weight combined silicon.

2. A high-boron silicon boride material containing in excess of 80% by weight combined boron, in excess of 6% by weight combined silicon, and containing about 1 to 3% of carbon.

3. As a new material of manufacture, crystalline silicon boride in the form of rhombic crystals having a combined boron content in excess of 80% by weight and a combined silicon content in excess of 6% by weight.

4. A crystalline silicon boride material of high boron content in which the combined boron amounts to at least 80% by weight and the combined silicon content amounts to at least 6% by weight, said material having a scratch hardness such that the crystals are capable of scratching silicon carbide and boron carbide.

5. A ternary boride composition of silicon, boron and carbon in which the chemically combined boron content amounts to at least 80% by weight, the chemically combined silicon content amounts to 6 to 20% by weight and the carbon content amounts to up to 8% by weight.

6. A ternary boride composition of silicon, boron and carbon in which the chemically combined boron content amounts to at least 80% by weight, the chemically combined silicon content amounts to 6 to 20% by weight and the carbon content amounts to up to 3% by weight.

7. A silicon-boron composition of matter consisting essentially of a boride having a chemically combined boron content of at least 80% by weight and a chemically combined silicon content of at least 6% by weight.

8. A silicon-boron composition of matter consisting essentially of a boride having a chemically combined boron content of at least 80% by weight, a chemically combined silicon content of at least 6% by weight, and containing a minor amount of carbon.

9. A boride composition of matter consisting essentially of boron and silicon and having a chemically combined boron content in the range of 79.6% to 86.5% by weight and containing in excess of 6% by weight of chemically combined silicon.

10. A ternary boride composition of matter consisting essentially of boron, silicon and carbon in which the chemically combined boron content is in the range of 79.6% to 86.5% by weight, the chemically combined silicon content is in the range 6% to 20% by weight, and the carbon content amounts to up to 3% by weight.

References Cited in the file of this patent

Mellor: Comprehensive Treatise on Inorganic and Theoretical Chemistry, volume 5, page 27.